United States Patent
Stol et al.

(10) Patent No.: US 10,053,603 B2
(45) Date of Patent: Aug. 21, 2018

(54) BLOCK COPOLYMERS CONTAINING A COPOLYMER MYRCENE BLOCK

(71) Applicant: KRATON POLYMERS U.S. LLC, Houston, TX (US)

(72) Inventors: Marianne Stol, Haarlem (NL); Martine Dupont, Brussels (BE)

(73) Assignee: Kraton Polymers U.S. LLC, Houston, TX (US)

( * ) Notice: Subject to any disclaimer, the term of this patent is extended or adjusted under 35 U.S.C. 154(b) by 69 days.

(21) Appl. No.: 14/243,083

(22) Filed: Apr. 2, 2014

(65) Prior Publication Data
US 2015/0284606 A1    Oct. 8, 2015

(51) Int. Cl.
| C09J 153/02 | (2006.01) |
| C08F 301/00 | (2006.01) |
| C08K 11/00 | (2006.01) |
| C08F 297/02 | (2006.01) |
| C09J 153/00 | (2006.01) |

(52) U.S. Cl.
CPC .......... C09J 153/02 (2013.01); C08F 297/02 (2013.01); C08F 301/00 (2013.01); C08K 11/00 (2013.01); C09J 153/00 (2013.01)

(58) Field of Classification Search
CPC ....... C09J 153/02; C08K 11/00; C08F 301/00
USPC ................................................ 524/574, 270
See application file for complete search history.

(56) References Cited

U.S. PATENT DOCUMENTS

| 2,383,084 | A | | 8/1945 | Rummelsburg |
| 2,549,539 | A | | 4/1951 | Westfield et al. |
| 2,829,065 | A | | 4/1958 | Gleason et al. |
| 3,149,182 | A | | 9/1964 | Porter |
| RE27,145 | E | | 6/1971 | Jones |
| 3,595,942 | A | | 7/1971 | Wald et al. |
| 3,634,549 | A | | 1/1972 | Shaw et al. |
| 3,670,054 | A | | 6/1972 | De La Mare |
| 3,700,633 | A | | 10/1972 | Wald et al. |
| 3,706,817 | A | | 12/1972 | Wald et al. |
| 3,985,830 | A | | 10/1976 | Fetters et al. |
| 4,039,593 | A | | 8/1977 | Kamienski et al. |
| 4,089,913 | A | | 5/1978 | Miki et al. |
| 4,122,134 | A | | 10/1978 | Miki et al. |
| 4,374,957 | A | * | 2/1983 | Quirk ................... C08F 297/04 525/314 |
| 4,391,949 | A | | 7/1983 | St. Clair |
| 4,444,953 | A | | 4/1984 | St. Clair |
| 4,780,367 | A | * | 10/1988 | Lau ....................... C09J 7/0221 428/355 BL |
| 5,191,024 | A | | 3/1993 | Shibata et al. |
| 5,306,779 | A | | 4/1994 | Shibata et al. |
| 5,346,964 | A | | 9/1994 | Shibata et al. |
| 5,364,723 | A | | 11/1994 | Georges et al. |
| 5,399,627 | A | | 3/1995 | Diehl et al. |
| 5,759,569 | A | | 6/1998 | Hird et al. |
| 6,291,107 | B1 | | 9/2001 | Shimizu |
| 6,797,776 | B1 | * | 9/2004 | Suzuki ..................... C08L 23/10 525/98 |
| 7,067,589 | B2 | | 6/2006 | Bening et al. |
| 7,169,848 | B2 | | 1/2007 | Bening et al. |
| 7,307,124 | B2 | | 12/2007 | Dubois |
| 7,625,979 | B2 | | 12/2009 | Atwood et al. |
| 7,655,739 | B1 | * | 2/2010 | McPhee .................. A61L 15/58 428/343 |
| 2001/0047055 | A1 | * | 11/2001 | Takeuchi .............. C08F 297/02 525/88 |
| 2004/0186215 | A1 | | 9/2004 | Lewtas et al. |
| 2004/0219322 | A1 | * | 11/2004 | Fisher ..................... B32B 15/06 428/40.1 |
| 2005/0186379 | A1 | | 8/2005 | Rhee et al. |
| 2007/0105986 | A1 | | 5/2007 | Kluttz et al. |
| 2008/0161485 | A1 | * | 7/2008 | Suzuki ...................... C08F 8/04 524/575 |
| 2009/0062420 | A1 | * | 3/2009 | Dubois .................... B41N 1/12 522/113 |
| 2010/0015442 | A1 | | 1/2010 | Shimoura et al. |
| 2010/0087559 | A1 | * | 4/2010 | Kusanose ................. C08F 8/04 521/148 |
| 2012/0010367 | A1 | | 1/2012 | Prunarely et al. |
| 2012/0128833 | A1 | | 5/2012 | Patel et al. |
| 2012/0248002 | A1 | | 10/2012 | Sun et al. |

FOREIGN PATENT DOCUMENTS

| CA | 716645 A | 8/1995 |
| CA | 716647 A | 8/1995 |

(Continued)

OTHER PUBLICATIONS

Bolton, J.M., Hillmyer, M.A., Hoye, T.R.; Sustainable Thermoplastic Elastomers From Terpene-Derived Monomers, ACS Macro Lett. 2014, 3, 717-720.

(Continued)

*Primary Examiner* — Deve E Valdez
(74) *Attorney, Agent, or Firm* — Samantha Page; Cantor Colburn LLP

(57) ABSTRACT

A block copolymer comprising: at least one monoalkenyl arene monomer polymer block (A) and copolymer block (B) containing myrcene, said copolymer block B also including:

a) at least one conjugated diene monomer having a lower molecular weight than myrcene, or b) at least one monoalkenyl arene monomer, or c) a mixture of a) and b).

The polymer block A may be a copolymer block. When the polymer block A is a copolymer block, both block A and the copolymer myrcene block copolymer B can have a random, tapered or a controlled distribution configuration of comonomers. The block copolymer can be selectively or exhaustively hydrogenated. The block copolymer may be used in making adhesives and vibration damping compositions.

16 Claims, 5 Drawing Sheets

(56) References Cited

FOREIGN PATENT DOCUMENTS

| | | | |
|---|---|---|---|
| CA | 2875448 | A1 | 12/2013 |
| EP | 2860198 | A1 | 4/2015 |
| FR | 2875448 | A1 | 12/2013 |
| GB | 1145378 | A | 4/1966 |
| WO | 200126620 | A1 | 4/2001 |
| WO | 2010027463 | A1 | 3/2010 |
| WO | 2010027464 | A1 | 3/2010 |
| WO | 2010100651 | A2 | 9/2010 |
| WO | 2012134454 | A1 | 10/2012 |
| WO | 2013183570 | A1 | 12/2013 |
| WO | WO2013183570 | * | 12/2013 |

OTHER PUBLICATIONS

Sivola, Arto; ACTA Polytechnica Scandinavica, Chemistry Including Metallurgy Series No. 134, Ch. 134, Helsinki 1977.

Raynaud, Jean; Wu, Jessica Y. and Ritter, Tobias, Iron-Catalyzed Polymerization of Isoprene and Other 1,3-Dienes, Iron Catalysis, Wiley-VCH Verlag GmbH & Co. KGaA, Weinheim, Agnew. Chem. Int. Ed. 2012, 51, 11805-11808.

Choi, Soowhan; Ritter, Helmut; Novel Polymerization of Myrcene in Aqueous Media via Cyclodextrin-Complexes, e-Polymers 2007, No. 045.

Trumbo, David, L., Free Radical Copolymerization Behavior of Myrcene—I. CopolymersWith Styrene, Methyl or Methacrylate p-Fluorostyrene, Polymer Bulletin, 31, 629-636 (1993).

Hsieh, H.L. and Quirk, R.P., Anionic Polymerization Principles and Practical Applications, New York, NY, Marcel Dekker, 1996.

Hsieh, H.L. and Quirk, R.P., Anionic Polymerization Principles and Practical Applications, Stereochemistry of Polymerization, Ch. 9, pp. 197-235, New York, NY, Marcel Dekker, 1996.

PCT/US2015/23842 International Search Report dated Aug. 27, 2015.

PCT/US2015/23857 International Search Report dated Jun. 24, 2015.

Quirk, Roderic P., Huang, Tzu-Li. Alkyllithium-Initiated Polymerization of Myrcene New Block Copolymers of Styrene and Myrcene. 1984. Springer, Boston, MA. pp. 329-355.

* cited by examiner

BLOCK COPOLYMERS CONTAINING A COPOLYMER MYRCENE BLOCK

FIELD OF THE INVENTION

The present invention comprises a novel monoalkenyl arene block copolymer having a copolymer myrcene block. Specifically, the invention is a block copolymer comprising at least one monoalkenyl arene polymer block (A) and polymer block (B) comprising myrcene. The invention further comprises hydrogenated versions of such block copolymers. The novel block copolymer may be used in making adhesives and vibration damping compositions.

BACKGROUND OF THE INVENTION

Block copolymers of monoalkenyl arenes and conjugated dienes are well known. For example, the preparation of linear styrene-conjugated diene-styrene block copolymers were taught in U.S. Pat. No. 3,149,182 and coupled, radial (styrene-conjugated diene)$_n$X block copolymers were taught in U.S. Pat. No. 7,625,979. These highly engineered materials are most readily prepared by anionic polymerization. Not all monomeric materials are suitable for such polymerization and, as such, prior developments have focused on anionic block copolymers comprising monoalkenyl arenes such as styrene and conjugated dienes such as butadiene and isoprene. Using this limited set of monomer building blocks a wide variety of materials having a broad range of properties have been made by varying, for example, the sizes of the blocks, the relative amounts of each block, and the arrangement of blocks within the copolymer.

Monomers derived from petrochemicals, like isoprene and butadiene, suffer from recurrent shortages and lack of sustainability. It is important to consider bio-derived monomers which can help reduce the need for petro-derived monomers. Terpenes are naturally occurring products that can be found in or synthesized from natural sources. Such terpenes include myrcene ($C_{10}H_{16}$). While myrcene is currently an expensive diene, its cost can be mitigated by employing a less costly diene in a copolymer diene block with myrcene. This practical approach allows construction of economically interesting materials maintaining the new properties inherent in myrcene block copolymers.

The need continues to exist for styrenic block copolymers that have properties similar or superior to styrene-isoprene-styrene or styrene-butadiene-styrene block copolymers. One way to achieve this is to incorporate a new monomer in the block copolymer. This leads to a different balance in properties which was not achieved before. The present invention addresses this need.

SUMMARY OF THE INVENTION

A block copolymer comprising: at least one monoalkenyl arene polymer block (A) and at least one copolymer block (B) containing myrcene, said copolymer block B further comprising:
  a) at least one conjugated diene monomer having a lower molecular weight than myrcene, or
  b) at least one monoalkenyl arene monomer, or
  c) a mixture of a) and b).
The copolymer block B can have a random, tapered, or controlled distribution configuration of comonomers.

Each A block has a molecular weight between about 3 kg/mol and about 60 kg/mol and each copolymer block B has a molecular weight between about 10 kg/mol and about 500 kg/mol.

The total amount of mono alkenyl arene in the block copolymer is about 10 weight percent to about 80 weight percent.

The amount of myrcene in the copolymer block B is from about 85 mol % to about 5 mol %.

The monoalkenyl arene may be selected from styrene, substituted styrenes such as methylstyrene, dimethylstyrene, alpha-methylstyrene, diphenyl ethylenes, or mixtures of these.

The other conjugated diene, which has a lower molecular weight than myrcene, may be selected from, but is not limited to butadiene, isoprene, piperylene, 1.3-hexadiene, or a mixture thereof.

In one embodiment the invention may be a block copolymer comprising at least one monoalkenyl arene polymer block (A) and at least one polymer block (B) containing myrcene which has been selectively or exhaustively hydrogenated.

The invention also embodies adhesives and vibration damping materials comprising the block copolymers.

All ranges set forth in the specification and claims include not only the end point of the ranges, but also every conceivable number between the end point of the ranges, since that is the very definition of a range. For example, ranges specifying the molecular weight, polystyrene content, vinyl content, coupling efficiency, etc., are intended to include this definition of a range.

BRIEF DESCRIPTION OF THE DRAWINGS

The drawings are provided as an aid in understanding the invention. However the drawings are not meant to limit the invention in a manner inconsistent with the scope of the claims.

FIG. 1 is a DMA curve for the inventive block copolymer S-M/Bd-S 1 illustrating G', G" and tan delta as function of temperature.

FIG. 2 is a DMA curve for the inventive block copolymer S-M/I-S 1 illustrating G', G" and tan delta as function of temperature.

FIG. 3 is a DMA curve for the comparative block copolymer S-I/Bd-S illustrating G', G" and tan delta as function of temperature.

FIG. 4 is a DMA curve for the comparative block copolymer SIS illustrating G', G" and tan delta as function of temperature.

DETAILED DESCRIPTION OF THE INVENTION

Figure 1:
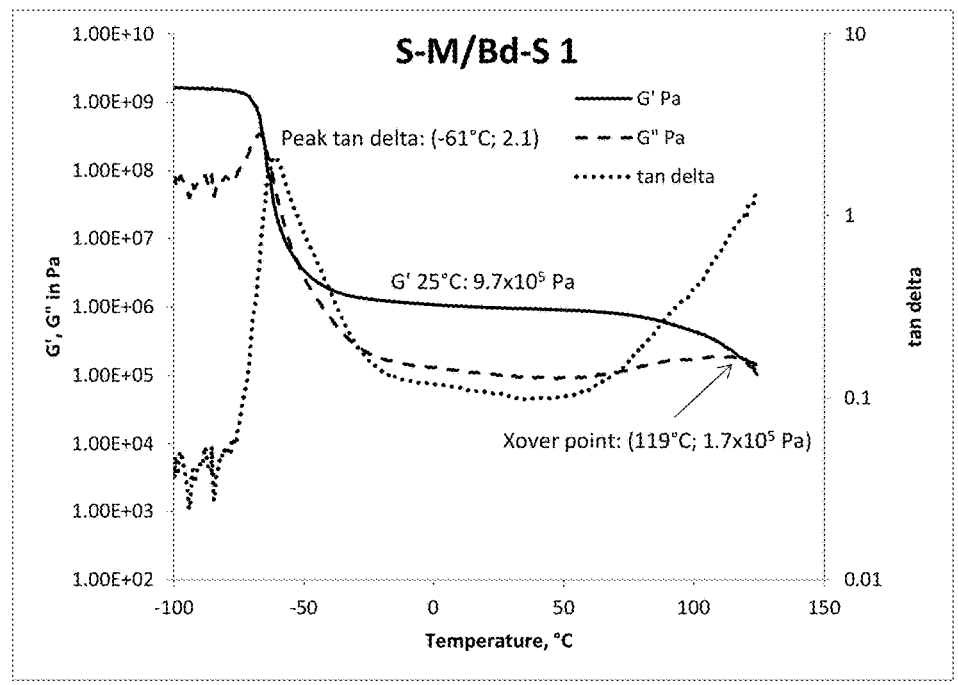
FIGS. 1-4 represent DMA curves. Various parameters are indicated on the graphs: 1) value of rubber glass transition temperature and peak height 2) value of elastic modulus at 25° C. in Pa 3) cross-over point temperature.

Myrcene is an anionically polymerizable monomer and can be represented by the following general formula:

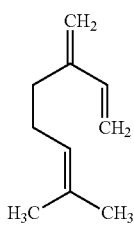

Myrcene has two isomers alpha and beta. The beta isomer is more abundant and is thus preferred for the present invention. Yet, both alpha and beta isomers work satisfactorily in the present invention. For the purposes of this invention we refer to myrcene as a conjugated diene. One skilled in the art would understand that this monomer actually has three alkenyl groups. However, two of those alkenyl groups reside adjacently in a conjugated fashion at one terminus of the monomer. It is this terminus having the conjugated diene that is active in anionic polymerizations.

The block copolymers of the invention may have structures according to the following general formulae: A-B, A-B-A, A-B-A', $(A-B)_n$, $(A-B)_n$-A, $(A-B-A)_nX$, $(A-B)_nX$, $(A-B-A')_nX$, $(A-B-A')_nX$, $(A-B-B')_nX$, and A-B-A'-B-A, wherein X is the residue of a coupling agent, n is an integer and ranges from 2 to 30, A and A' are polymer blocks of monoalkenyl arenets) and A and A' may differ with regard to molecular weight or composition, B and B' are copolymer blocks comprising myrcene and B and B' may differ with regard to molecular weight or composition. In preferred embodiments the B and B' blocks comprise tnyrcene and at least one other monomer. The block copolymer structures of the invention are not limited to those listed here. One skilled in the art would understand that a broad variety of arrangements of the blocks could be made by sequential and coupling polymerization procedures.

In the present invention the A blocks have a molecular weight of 3-60 kg/mol, preferred 5-45 kg/mol, and most preferred 6-35 kg/mol. The molecular weight of the copolymer myrcene block B is from about 10 to about 500 kg/mol, preferably 15-300 kg/mol, and most preferred 25-220 kg/mol. The skilled person would understand that when considering a diblock polymer which results from incomplete coupling, the molecular weight ranges of the copolymer B block would be half of those specified here.

As used herein, the term "molecular weights" refers to the apparent molecular weight in kg/mol of the polymer or block of the copolymer. The molecular weights referred to in this specification and claims can be measured with gel permeation chromatography (GPC) using polystyrene calibration standards, such as is done according to ASTM D5296. GPC is a well-known method wherein polymers are separated according to molecular size, the largest molecule eluting first. The chromatograph is calibrated using commercially available polystyrene molecular weight standards. The molecular weight of copolymers measured using GPC so calibrated are styrene equivalent molecular weights and are referred to as apparent molecular weights. The apparent molecular weights differ from the absolute or true molecular weight when the composition of the polymer eluting through the GPC columns is different in composition from polystyrene. However, comparison to well characterized model polymers allows conversion from apparent molecular weight to true or absolute molecular weight when necessary. The detection method used is preferably a combination of ultraviolet and refractive index detectors. The molecular weights expressed herein are measured at the peak of the GPC trace, and are commonly referred to as "peak molecular weights" (Mp).

Examples of suitable monoalkenyl arenes for the present invention are styrene and substituted styrenes such as methylstyrene, p-tert-butylstyrene, dimethylstyrene, alpha-methylstyrene, diphenyl ethylenes and the like, including mixtures of these, but preferred is styrene. The A and A' block and any monoalkenyl arene in the copolymer myrcene. B block copolymer will comprise 100 wt. % of the monoalkenyl arene content.

The monoalkenyl arene content of the block copolymer is at least 10 wt. %, based on the total weight of the block copolymer. Thus the monoalkenyl arene block could be 10, 20, 30, 40, 50, 60, 70 or 80 wt. %, including all points in between, based on the total weight of the block copolymer. Thus, the myrcene copolymer block copolymer is from 20, 30, 40, 50, 60, 70, 80, and 90 wt. %, including all points in between, based on the total weight of monoalkenyl arene block-myrcene-containing block copolymer.

Suitable conjugated dienes having a lower molecular weight than myrcene include, but are not limited to, butadiene, isoprene, piperylene, 1,3-hexadiene, or a mixture thereof. The amount of myrcene in the polymer block B is up to 85 mol % based on the total polymer B block with the remainder being conjugated dienes having a lower molecular weight than myrcene. In preferred embodiments the amount of myrcene is from 85 mol % to 5 mol %. The scope of the invention also includes a copolymer block B or B' having two or more conjugated dienes each having a lower molecular weight than myrcene. For example, a copolymer myrcene block can be 5 or 25 or 45, or 65 or 85 mol % myrcene, with the remainder being a mixture of one or more of the lower molecular weight dienes mentioned above. This arrangement is the a) copolymer myrcene block mentioned previously.

The conjugated diene section of the monomers can be represented by $[C^1\!\!=\!\!C^2\!\!-\!\!C^3\!\!=\!\!C^4]$. Anionic polymerization of a conjugated diene can result in a polymer with all four of these carbons incorporated into the polymer backbone or, alternately, only two of these carbons ($C^1\!\!-\!\!C^2$ or $C^3\!\!-\!\!C^4$) incorporated into the polymer backbone. Incorporation of all four carbons in the polymer backbone occurs by way of 1,4-addition in the case of butadiene. Alternately, incorporation of only two carbons in the polymer backbone proceeds by 1,2-addition for butadiene. In the case of isoprene, incorporation of only two carbons in the polymer backbone proceeds by 3,4-addition. 1,2- or 3,4-addition of butadiene and isoprene, respectively, yields a group pendant to the polymer backbone and for the purposes of this invention is referred to as a vinyl group. The amount of this vinyl group present in the conjugated diene block is referred to as vinyl content. Analogous additions of the conjugated diene section of myrcene will occur such that four or two carbons of the myrcene monomer will be incorporated in the polymer backbone. The portion of myrcene monomers for which only two carbons are incorporated by a 3,4-addition process in the polymer backbone contributes to the vinyl content. Set forth below are the explanatory polydiene microstructures of butadiene, isoprene and myrcene, (ref: H. L. Hsieh and R. P. Quirk, ANIONIC POLYMERIZATION principles and practical applications, New York, N.Y.: Marcel Dekker, 1996.), where for butadiene R is H, for isoprene R is methyl ($CH_3$), and for myrcene R is $CH_2CH_2CHC(CH_3)_2$

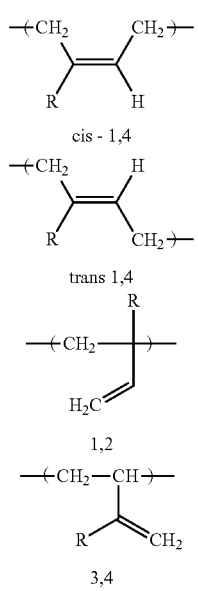

Those skilled in the art will understand that the polarity of the solvent used influences the ratio of 1,4- to 1,2 incorporation. An increase in solvent polarity typically increases the vinyl content. Accordingly, the vinyl content of the present invention is from about 5 to about 80 mol. % of the total amount of conjugated diene units present in the polymer.

If the polymer block B contains myrcene and at least one monoalkenyl arene monomer, then again the amount of myrcene content is from 5 to 85 mol. % with the remainder being one or more monoalkenyl arenes. Thus, the polymer block B can be myrcene and styrene, for example, or myrcene, styrene and alpha-methylstyrene. The amount of myrcene and the other components remains the same as set forth in the previous paragraphs. This arrangement is the b) copolymer myrcene block mentioned previously.

As stated above, the polymer block B can also contain both monoalkenyl arene and a lower molecular weight diene. The amount of myrcene and the other components remains the same as set forth in the previous paragraphs. This arrangement is the c) copolymer myrcene block mentioned previously.

Anionic polymerization of monoalkenyl arenes and conjugated dienes with lithium initiators is well known as described in U.S. Pat. Nos. 4,039,593 and Re 27,145. Polymerization commences with monolithium, dilithium or polylithium initiators which build a living polymer backbone at each lithium site.

In general, the polymers useful in this invention may be prepared by contacting the monomer or monomers with an organoalkali metal compound in a suitable solvent at a temperature range of from −150° to 300° C., preferably at a temperature range of 0 to 100° C. Particularly effective polymerization initiators are organolithium compounds having the general formula RLi wherein R is an aliphatic, cycloaliphatic, or alkyl-substituted cycloaliphatic radical having from 1 to 20 carbon atoms. Suitable solvents include aliphatic hydrocarbons such as butane, pentane, hexane, heptanes or cyclohexane or cycloheptane, benzene, toluene and xylene and ethers such as tetrahydrofuran or diethylether.

Sequential Polymerization. The present invention relates to a block copolymer having at least one polymer block of monoalkenyl arene and at least one copolymer myrcene block, formed sequentially in diblock, triblock, or multiblock structures. While the structure of the diblock copolymer form is self-evident (a monoalkenyl arene polymer block and a polymer block containing myrcene), a triblock copolymer comprises two terminal monoalkenyl arene polymer blocks and one polymer block containing myrcene. Monoalkenyl arene polymer-myrcene-containing polymer diblocks are made by a sequential polymerization process in which the first step comprises polymerizing monoalkenyl arene with an organolithium initiator until polymerization of the monoalkenyl arene is substantially complete. Then, in a second step myrcene and, if also included, comonomer(s) are added to the reactor containing the living polymer block of monoalkenyl arene produced from the first step. Polymerization occurs spontaneously, and is allowed to proceed until substantially all the myrcene and comonomers have polymerized to form a polyalkenyl arene-copolymer myrcene diblock. Thereafter, if a triblock copolymer is desired, an additional amount of a monoalkenyl arene can be added to the living polyalkenyl arene-copolymer myrcene diblock, preferably in a proportion approximately equal to that in the first step. Again, polymerization readily occurs and is allowed to continue until substantially all of the additional monoalkenyl arene monomer has polymerized. In this manner, a polyalkenyl arene-myrcene-containing polymer-polyalkenyl arene triblock copolymer, such as polystyrene-poly(myrcene/butadiene)-polystyrene is formed. Also in this manner, a polystyrene-poly(myrcene/styrene)-polystyrene triblock copolymer is formed. Using this same procedure, linear block copolymer structures having a multitude of blocks can be made. For example, $(A-B)_n-A$ structures where n is an integer and ranges from 2 to 30 can be made by sequential polymerization.

Coupled Polymerization. Preparation of radial, branched (sometimes referred to as "star" block copolymer) or linear coupled block copolymers requires a post-polymerization step called "coupling". In the formula, $(A-B)_nX$ for the radial block copolymer, A is a block of polymerized monoalkenyl arene, B is a polymer block comprising myrcene, where n is an integer ranging from 2 to about 30, preferably from about 2 to about 5, and X is the remnant or residue of a coupling agent. A-B block copolymers are formed by sequential polymerization as described above. Under suitable conditions, living diblock A-B copolymer "arms" are coupled together forming a triblock copolymer when "n" equals 2 (meaning 2 arms of diblock copolymers are coupled together) or a radial copolymer when "n" is greater than 2. Radial copolymers having three or more arms typically result in a lower viscosity than sequentially produced triblock copolymers at equal molecular weight and equivalent relative amounts of A and B blocks. Further, the A blocks are much more uniform in molecular weight and composition in a coupling procedure compared to sequential polymerization.

The embodiments of this invention are not limited to symmetric, coupled block copolymers. The coupled arms may be identical resulting in symmetrical, coupled polymers or they may be different resulting in asymmetric, coupled polymers. In asymmetric embodiments some arms may contain no monoalkenyl arene polymer block or no copolymer myrcene block. Further, asymmetric, coupled block copolymers may contain arms in which the molecular weight of the A and B blocks, and the composition of the A and B block may vary. In such asymmetric, coupled block copolymers the blocks can be represented as A, A', B, B' to indicate differences in molecular weight or in composition.

A variety of coupling agents are known in the art and include, for example, dihalo alkanes, silicon halides, siloxanes, multifunctional epoxides, silica compounds, esters of monohydric alcohols with carboxylic acids, (e.g. dimethyl adipate) and epoxidized oils. Star-shaped polymers are prepared with polyalkenyl coupling agents as disclosed in, for example, U.S. Pat Nos. 3,985,830; 4,391,949; and 4,444,953; and Canadian Pat. No. 716,645. Suitable polyalkenyl coupling agents include divinylbenzene, and preferably m-divinylbenzene. Preferred are tetra-alkoxysilanes such as tetra-ethoxysilane (TEOS) and tetra-methoxysilane, alkyl-trialkoxysilanes such as methyl-trimethoxy silane (MTMS), aliphatic diesters such as dimethyl adipate and diethyl adipate, and diglycidyl aromatic epoxy compounds such as diglycidyl ethers deriving from the reaction of bis-phenol A and epichlorohydrin.

The block copolymers used in the present invention have a coupling efficiency ("CE") of about 20 to 100 percent, including all points in-between. The CE depends on the structure desired. In the case of radial or starblock copolymers, when the CE is less than 100%, it means the remainder is uncoupled arm. The CE is defined as the proportion of polymer chain ends which were living, polymer-lithium chain ends, at the time the coupling agent was added, versus those that are linked via the residue of the coupling agent at the completion of the coupling reaction. In practice, GPC data is used to calculate the coupling efficiency for a polymer product and is reported as a percentage of the total arms.

U.S. Pat. No. 5,399,627 teaches that a small amount of butadiene at the end of the diene midblock is useful in that it enhances the coupling reaction in formation of the polymer, and results in a radial polymer with a higher number of branches. Separately, it is known that addition of a small amount of butadiene may enhance the cross-over from one block to another or may enhance the phase separation of two adjacent blocks. The amount of butadiene need be added only in an amount necessary to assure that the ends of all of the non-butadiene segments of the polymer chains are provided with at least one molecule of butadiene, though as suggested the butadiene can be added—usually about 1 to 3 wt. % of the total weight of the styrene block copolymer to make certain a sufficient amount is present for the reaction to proceed in a reasonable time frame. The coupled monoalkenyl arene-myrcene-containing block copolymers of the present invention may be made using such a method to enhance coupling.

In both sequential polymerization and coupling procedures, random copolymerization of monomers within blocks are known from U.S. Pat. Nos. 3,700,633; 4,089,913 and 4,122,134 for example. These techniques can be applied to the block copolymers of the present invention. Tapered blocks are known from U.S. Pat. Nos. 5,191,024; 5,306,779 and 5,346,964 for example. These techniques can also be applied to the present invention. A controlled distribution configuration of comonomers is one in which the copolymer block has a specific arrangement of comonomers such that, among other features, the comonomers have a low blockiness index. Controlled distribution comonomer configurations and techniques for making them are known from U.S. Pat. Nos. 7,169,848 and 7,067,589. These techniques can be applied to the present invention.

Controlled distribution relative to the present invention broadly comprises a block copolymer having at least one A block and at least one B block, wherein:

a) each A block is monoalkenyl arene polymer block and each B block is a controlled distribution copolymer myrcene block with at least one monoalkenyl arene monomer; and b) each B block comprises terminal regions adjacent to the A block that are rich in conjugated diene units and one or more regions not adjacent to the A blocks that are rich in monoalkenyl arene units.

Hydrogenation can be carried out via any of the several hydrogenation or selective hydrogenation processes known in the prior art. For example, such hydrogenation has been accomplished using methods such as those taught in, for example, U.S. Pat. Nos. 3,595,942; 3,634,549; 3,670,054; 3,700,633; and Re. 27,145, the disclosures of which are incorporated herein by reference. These methods operate to hydrogenate polymers containing aromatic or ethylenic unsaturation and are based upon operation of a suitable catalyst. Such catalyst, or catalyst precursor, preferably comprises a Group VIII metal such as nickel or cobalt which is combined with a suitable reducing agent such as an aluminum alkyl or hydride of a metal selected from Groups I-A, II-A and III-B of the Periodic Table of the Elements, particularly lithium, magnesium or aluminum. This preparation can be accomplished in a suitable solvent or diluent at a temperature from about 20° C. to about 80° C. Other catalysts that are useful include titanium based catalyst systems.

Selective hydrogenation can be carried out under such conditions that at least about 60 mol. % of the conjugated diene double bonds have been reduced (which includes the pendant double bond in the myrcene units), and between 0 and 10 mol. % of the arene double bonds present in the polymerized monoalkenyl arene units have been reduced. Preferred ranges are at least about 90 mol. % of the conjugated diene double bonds reduced, and more preferably at least about 95 mol. % of the conjugated diene double bonds are reduced, and most preferably at least about 98 mol. %.

Alternatively, it is possible to exhaustively hydrogenate the polymer such that arene double bonds are also reduced beyond the 10 mol. % level. Such exhaustive hydrogenation is usually achieved at higher temperatures and/or with different catalysts. In the case of exhaustive hydrogenation, the double bonds of both the conjugated diene and arene may be reduced by 90 mol. % or more.

Once the hydrogenation is complete, it is preferable to extract the catalyst by stirring with the polymer solution a relatively large amount of aqueous acid (preferably 20-30 percent by weight), at a volume ratio of about 0.4 parts aqueous acid to 1 part polymer solution. Suitable acids include phosphoric acid, sulfuric acid and organic acids. This stirring is continued at about 50 to about 70° C. for about 30 to about 60 minutes while sparging with air. Care must be exercised in this step to avoid forming an explosive mixture of oxygen and hydrocarbons.

Typical pressure sensitive adhesives or hot-melt adhesives contain, based on 100 parts of the styrene-myrcene block copolymer: about 30 to 250 parts of a suitable tackifier, about 0 to 80 parts of a suitable plasticizer, and about 0.1 to 3 parts by weight of a stabilizer.

Suitable tackifiers may be selected from the group of compatible $C_5$, $C_9$ or $C_5/C_9$ hydrocarbon resins, hydrogenated or partially hydrogenated $C_5$ or $C_9$ hydrocarbon resins, or styrenated $C_5$ or $C_9$ resins. Additionally, suitable tackifiers include terpenes, styrenated terpene resins, fully hydrogenated or partially hydrogenated terpene resins, rosin esters, rosin derivatives and mixtures thereof Suitable commercially available tackifying resins of the present invention include Piccotac 1095-N, which is an aliphatic resin or Piccotac 8590 which is an aliphatic/aromatic resin. Also suitable are the commercially available hydrocarbon tackifying resins of the Regalrez™ series such as Regalrez™ 1018, Regalrez™ 1085 or Regalrez™ 6108 and other resins sold under the trademarks "Regalite", "Escorez", "Wingtack", and "Arkon".

Adhesives compositions of the present invention may contain one or more plasticizers. Suitable plasticizers include plasticizing oils such as paraffinic or naphthenic in character. Products such as these are available from Shell Oil Company under the trademark SHELLFLEX®, also under the trademark CATENEX™ and EDELEX™ and ONDINA® and Drake oils. EDELEX® N956 is set forth in the Examples.

The use of one or more stabilizers, such as an antioxidant, is particularly suitable with hot melt adhesive compositions. The antioxidants can be used either as a primary antioxidant such as hindered phenols or secondary antioxidants such as phosphite derivatives, or blends thereof Acceptable stabilizers are Irganox® 565, 1010, 1076, or 1726 or Irgafos® 168, all by BASF, or Sumilizer® GS or T-PD from Sumitomo, or Ethanox 330 from Albemare.

The incorporation of inorganic fillers is important in the end use applications of the block copolymer. In particular, fillers are important to increase the mass and density of articles intended as vibration damping compositions. The nature and amount of the inorganic fillers present in the damping composition have an important effect on the extent of damping and on how vibration propagation is affected by temperature and frequency. Different morphologies of inorganic filler can be used. For example, fillers having a platelet form or those having a non-platelet form can be used. Examples of inorganic fillers in platelet form are mica, talc, flaked aluminum, flaked lead, and graphite. Mica has been found to be particularly effective. Various non-platelet fillers may be employed, for example, clay, calcium carbonate, barytes (barium sulfate), silica and iron powder. A synergistic effect can be realized between the platelet and non-platelet fillers. The total amount of filler employed can be high. As the amount increases the damping improves. The upper limit in filler content is determined by the required physical and mechanical properties of the final composition, such as, flexibility, tear strength and moldability.

In the present invention vibration damping compositions comprise 100 parts by weight of the block copolymer, from about 50 to about 100 parts by weight of a tackifier and an inorganic filler. As mentioned above the amount of filler can be as high as possible while maintaining desired physical and mechanical properties of the composition. Amounts of filler up to 800 parts by weight are useful. The preferred amount of filler is up to 300 parts by weight and the most preferred amount is up to 50 parts by weight.

The polymer blends of the present invention may be compounded further with other polymers, reinforcements, fire retardants, antiblocking agents, lubricants and other rubber and plastic compounding ingredients without departing from the scope of this invention.

EXAMPLES

For the purposes of this invention, and in the following examples illustrating such, S represents a block of polymerized styrene, I represents a block of polymerized isoprene, Bd represents a block of polymerized butadiene, M/Bd represents a copolymerized block of myrcene and butadiene, M/I represents a copolymerized block of myrcene and isoprene, M/S represents a copolymerized block of myrcene and styrene, and I/Bd represents a block of copolymerized isoprene and butadiene.

Example 1

Inventive styrene-copolymer myrcene/diene block copolymers were synthesized using the following procedure.

Cyclohexane and styrene were purchased from Caldic. Butadiene was purchased from Gerling Holz and Co. Myrcene was purchased from Aldrich. Sec-butyllithium was purchased from Acros. Methyltrimethoxysilane (MTMS) was purchased from Evonik Industries. EPON™ Resin 826 was purchased from Momentive.

Cyclohexane, styrene, butadiene, isoprene and myrcene were purified by activated aluminum oxide and stored at 4° C. under a nitrogen atmosphere. The coupling agent EPON™ Resin 826 was used as received, dissolved in toluene. The coupling agent MTMS was used as received.

Monomer mixtures were prepared of previously purified butadiene and myrcene and subsequently previously purified isoprene and myrcene in portable pressure vessels. To a mixture of 2.913 kg of myrcene in 933 g cyclohexane, 1.155 kg butadiene was added to make a 1:1 molar ratio mixture of myrcene:butadiene (50 mol % myrcene). To 501 g of myrcene, 495 g of isoprene was added to make a 1:2 molar ratio mixture of myrcene:isoprene (33.6 mol. % myrcene). This mixture was diluted with 996 g of cyclohexane.

The polymerizations were carried out according to the following procedure: The desired amount of solvent (cyclohexane) was added to the autoclave (10 L, jacket water cooled), and heated to 50° C. Sec-butyllithium was added to the autoclave, followed by the styrene dose. After conversion of the styrene, the appropriate monomer mixture was added to the reactor (which was heated to 60° C.) at a rate of 10-12 g/min. This rate allowed for immediate monomer conversion upon addition. After completion of the monomer addition, the mixture was allowed to react for another 20 minutes after which the coupling agent (EPON™ Resin 826 or MTMS) was added in three aliquots. After 1.5-2.5 hours of coupling time the reaction was terminated with alcohol (see table 1) and optionally stabilized. Polymer crumbs of S-M/Bd-S 1 and S-M/I-S 1 were obtained by steam coagulation finishing, followed by drying in an oven at 50° C. The solution of S-M/Bd-S 2 was transferred to a portable pressure vessel under inert atmosphere. The experimental details and results are reported in Table 1.

TABLE 1

|  | S-M/Bd-S 1 | S-M/Bd-S 2 | S-M/I-S 1 |
| --- | --- | --- | --- |
| Cyclohexane (kg) | 4.67 | 4.67 | 4.67 |
| Sec-BuLi (mL) | 39.5 | 66 | 36 |
| Styrene (g) | 149.5 | 153.6 | 158.1 |
| Monomer mixture (g) | myrcene/butadiene (615.8) | myrcene/butadiene (697.6) | myrcene/isoprene (538.4) |
| Coupling Agent (g) | EPON™ Resin 826 (2.4) | MTMS (1.6) | EPON™ Resin 826 (1.6) |
| Alcohol (mL) | methanol (1) | 2-ethyl-hexanol (1) | methanol (2) |
| Stabilizers | 0.15 w % IRG-565 0.2 w % IRG-168 | none | 0.2 w % AO330 0.1 w % IRG-565 0.2 w % IRG-168 |
| Mp Polystyrene (kg/mol) | 10.9 | 6.4 | 15.3 |

TABLE 1-continued

|  | S-M/<br>Bd-S 1 | S-M/<br>Bd-S 2 | S-M/<br>I-S 1 |
|---|---|---|---|
| Mp diblock copolymer (kg/mol) (apparent) | 68.0 | 49.3 | 95.9 |
| Mp (A-B)$_n$X (kg/mol) (apparent) | 147 (S-M/Bd)$_2$X | 102 (S-M/Bd)$_2$X | 193 (S-M/I)$_2$X |
| CE (%) | 78.1 | 83.3 | 77.1 |

Polymer Testing

Example 2

The molecular characteristics and resulting melt flow rates of comparative polymers (S-I/Bd-S and SIS) and inventive polymers (S-M/Bd-S 1 and S-M/I-S 1) are listed in Table 2. The comparative polymers are commonly used in adhesive formulations.

TABLE 2

|  |  | S-I/Bd-S | SIS | S-M/Bd-S 1 | S-M/I-S 1 |
|---|---|---|---|---|---|
| Mp Polystyrene (A) | kg/mol | 11 | 15.5 | 10.9 | 15.3 |
| Mp A-B-A apparent | kg/mol | 183 | 210 | 147 | 193 |
| PSC - NMR | % | 19 | 22 | 20 | 22 |
| CE | % | 73 | 81 | 78 | 77 |
| MFR (200° C./5 kg) | g/10 min | 13 | 3 | 185 | 17 |

The S-M/Bd-S 1 block copolymer has very high melt flow rate (MFR), and significantly higher than a S-I/Bd-S molecule with similar PS (polystyrene) block size and PS content. Comparing S-M/I-S 1 with a SIS polymer, the same conclusion can be drawn: replacing some of the isoprene by myrcene, on a weight per weight basis, in the rubber midblock significantly increases the MFR. This significantly eases the hot-melt processing of formulations based on styrenic block copolymers (SBC polymers) with a relatively long PS block, which are generally difficult to process when they are SBdS or SIS copolymers.

Example 3

Figure 3:
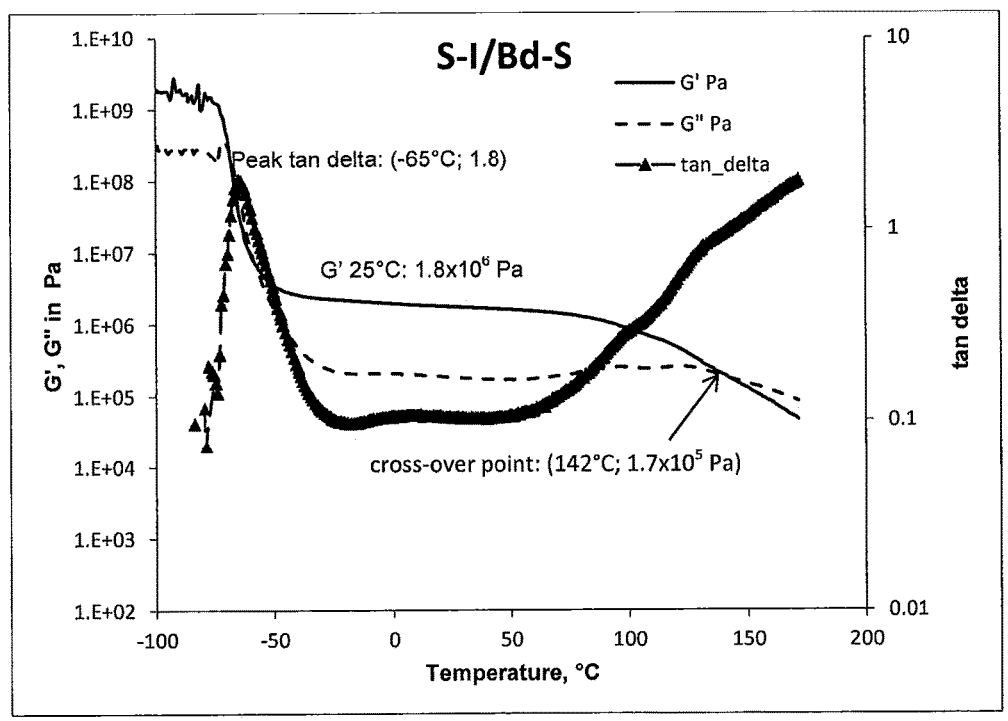

The dynamic mechanical properties of the comparative polymers (S-I/Bd-S and SIS) and inventive polymers (S-M/Bd-S 1 and S-M/I-S 1) were measured using RDA II Rheometric Scientific rheometer. FIG. 1 shows the DMA curve of the inventive S-M/Bd-S 1 polymer, which can be compared to that of the comparative polymer S-I/Bd-S (FIG. 3) with similar polystyrene content. The rubber tan delta peak of the inventive S-M/Bd-S 1 polymer was broader and higher, which made it particularly attractive for vibration damping applications. The elastic modulus at room temperature (G' 25° C.) is 40% lower, which showed the high softness of the grade. The plateau modulus remained flat over a wide temperature range, which indicated that formulations based on this grade should exhibit a broad service temperature range.

Figure 2:
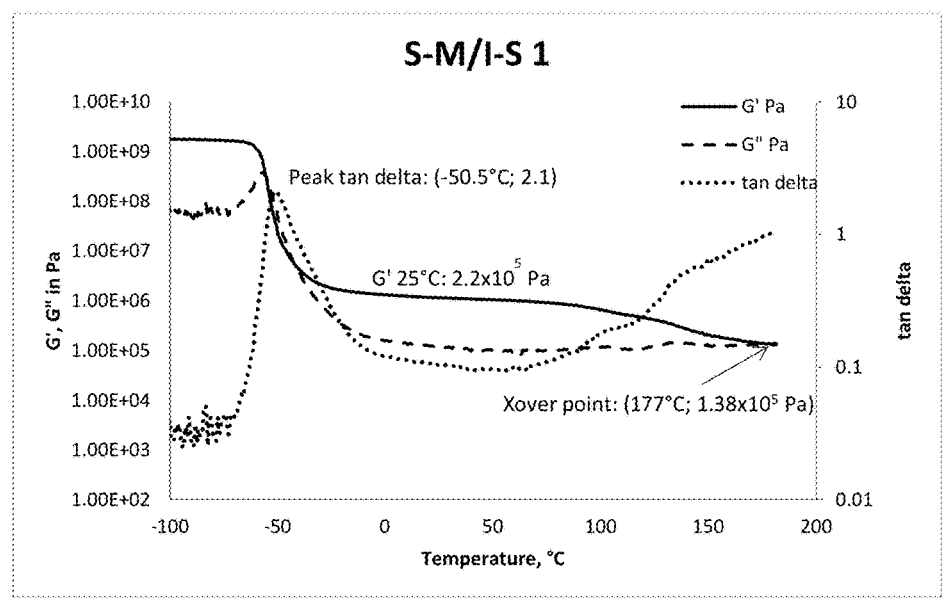
Figure 4:
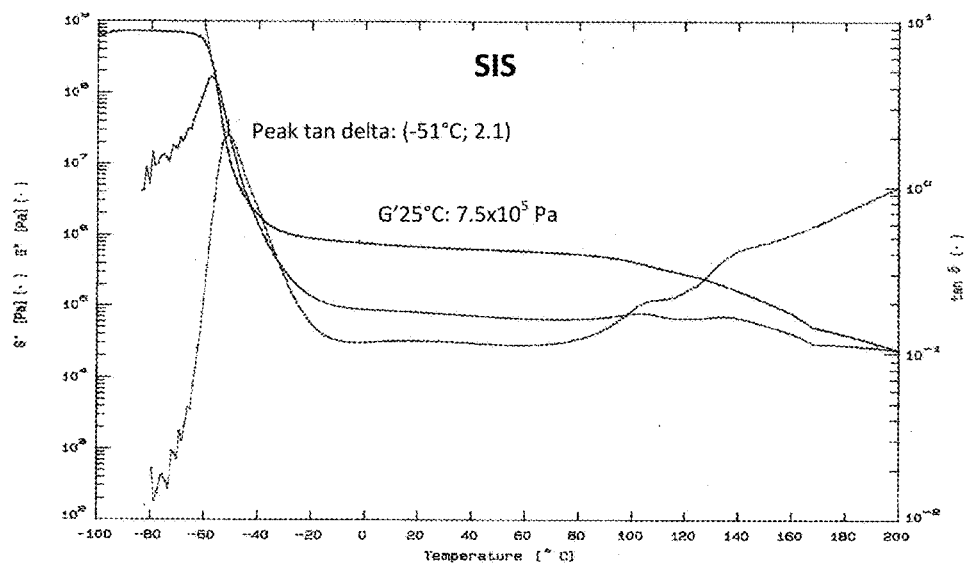

The dynamic mechanical results for the inventive S-MA-S 1 polymer (FIG. 2) showed also significantly lower elastic modulus at 25° C. (G') than for a similar SIS (FIG. 4) and a lower—however still high— cross over point (temperature at which the viscous modulus G" equals the elastic modulus G' and the polymer starts to flow). The height of the rubber tan delta peak was high and in this case similar to the SIS (2.1) but the breadth was significantly larger; showing again that block copolymers containing a copolymer myrcene block have high potential for vibration damping applications.

Example 4

Adhesive formulations were made using the polymers of the invention and comparative polymers. The inventive formulations are F1 and F3 which were based on block copolymers having copolymer myrcene blocks. Adhesive formulations F2 and F4 are comparative examples and were based on either block copolymers having a copolymer block of isoprene and butadiene (F2) or having a homopolymer block of isoprene (F4). The formulations set forth in Table 3 were hot-melt prepared. The polymer/resin/oil ratio were kept similar (typical tape formulation) but the tackifying resin changed in function of the reference polymer (S-I/Bd-S copolymers are not compatible with fully aliphatic tackifying resins for example). Piccotac 1095E is a C5 aliphatic tackifing resin. Piccotac 8090 is a $C_5/C_9$ tackifing resin.

TABLE 3

| Ingredient | F1 | F2 | F3 | F4 |
|---|---|---|---|---|
| S-M/Bd-S 1 | 100 | — | — | — |
| S-M/I-S 1 | — | — | 100 | — |
| (S-I/Bd-S) | — | 100 | — | — |
| (SIS) | — | — | — | 100 |
| Piccotac 1095E -C$_5$ | — | — | 125 | 125 |
| Piccotac 8090 C$_5$/C$_9$ | 125 | 125 | — | — |
| Edelex N956 -oil | 25 | 25 | 25 | 25 |
| Irganox 1010 | 3 | 3 | 3 | 3 |

Figure 5:
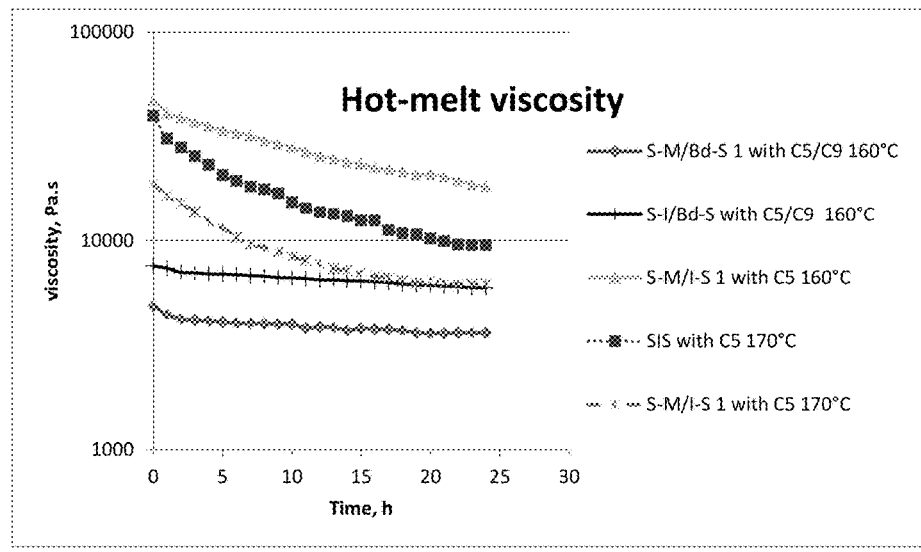
FIG. 5 is a graph of the hot-melt stability versus a 24 hour time period of various adhesive formulations based on S-M/Bd-S 1, S-I/Bd-S with $C_5/C_9$ tackifier, and a S-M/I-S 1, SIS with a $C_5$ tackifier.

Hot-melt viscosity of the adhesive formulations were measured using a Brookfield viscometer RVDV II. FIG. 5 shows the result for the inventive S-M/Bd-S 1-based formulation (F1). That formulation exhibited low and stable hot-melt viscosity. A similar result was found for the comparative S-I/Bd-S-based formulation (F2), but at a higher level. The inventive S-M/I-S 1-based formulation (F3) (myrcene/isoprene molar ratio was 1:2) showed a significant viscosity decrease with time. It behaved more similarly to the comparative SIS-based formulation (F4), but with lower viscosity and lower viscosity decrease under the same conditions. It should be noted that the myrcene ratio in the myrcene copolymer was lower for the S-M/I-S 1 block copolymer than for the S-M/Bd-S 1 block copolymer (33.6 mol. % vs 50 mol. %). Still the replacement of isoprene by myrcene in the block copolymer (compare SIS with S-M/I-S 1) significantly lowers the hot melt viscosity of the adhesive compositions. Even to such an extent that the hot melt viscosity of the composition with S-M/I-S 1 could be measured at a lower temperature (160° C. vs 170° C., FIG. 5).

Example 5

The adhesive properties of the formulations prepared in Example 4 were measured using standard tests. The formulations of Example 4 were dissolved in toluene and solvent coated at a thickness of 22 g/m$^2$. RBT means rolling ball tack where smaller numbers represent more aggressive tack. LT means loop tack where bigger numbers are more aggressive tack. PA is peel adhesion where higher numbers are higher adhesion. HP means holding power where higher numbers are higher cohesion. SAFT means shear adhesion failure temperature in ° C. The test methods can be found in Table 4 and results are reported in Table 5 below.

TABLE 4

Test Methods

| | |
|---|---|
| Rolling Ball Tack (RBT) | PSTC 6 |
| Loop Tack (LT) on stainless steel | FTM 9 |
| Peel Adhesion (PA) 180° on stainless steel | FTM 1 |
| Holding Power (HP), RT, 12.5 × 25 mm² on stainless steel | FTM 8 |
| Shear Adhesion Failure Temperature (SAFT), 500 g, ° C. | Proprietary method |

TABLE 5

Adhesive Properties

| | Ingredient | | | |
|---|---|---|---|---|
| | F1 S-M/Bd-S 1 | F2 S-I/Bd-S | F3 S-M/I-S 1 | F4 SIS |
| RBT, cm | 20 | >30 | >30 | 26 |
| LT, N/25 mm | 15 | 8 | 22 | 21 |
| PA, N/25 mm | 18 | 19 | 29 | 25 |
| HP, 2 kg | >24 | 5 | 5 | 3 |
| SAFT | 75 | 76 | 78 | 76 |

All LT and PA samples showed adhesive transfer. All the HP failures were cohesive. Formulation F1, the inventive S-M/Bd-S 1 based adhesive, had better tack and cohesion than F2, the comparative S-I/Bd-S-based adhesive. F3, the inventive S-M/I-S 1 based adhesive exhibited comparable results (slightly higher PA and HP) to the comparative SIS-based adhesive while exhibiting lower viscosity. Only minor difference in SAFT can be observed between the various polymers.

Example 6 (Hypothetical)

A monomer mixture is prepared with anionic polymerization grade myrcene (680 g) and styrene (120 g) in a portable pressure vessel to make a 4.33:1 molar ratio mixture of myrcene to styrene (81 mol % myrcene). Using anionic polymerization grade solvents, monomers and lithium alkyl initiators and using standard anionic polymerization techniques, 4.5 kg of cyclohexane is heated to 50° C. in a 10 liter, water jacket cooled reactor, and treated with 11 mL of sec-Butyllithium (s-BuLi; 0.3 M solution in cyclohexane). About 50 g of styrene monomer is added to afford a first polymer block of about 15 kg/mol true molecular weight (Mw). Initiation of polymerization will be noted by a change in color of the solution to red-orange and a modest increase in the temperature of the polymerization solution. After completion of polymerization of the styrene monomer, about 400 g of the myrcene/styrene monomer mixture is added at such a rate that all monomer is consumed during the addition. The monomer consumption can be monitored by in-situ Mid-IR techniques. When all monomer is added, the reaction mixture is stirred for another 10 minutes to yield a diblock copolymer of about 136 kg/mol true Mw. If a diblock is desired the polymerization is next terminated. When a triblock copolymer is desired there is no termination step and about 50 g styrene monomer is added next to afford a third block copolymer. When the styrene conversion is complete, the living polymer chains are terminated with 0.5 mL methanol to afford a triblock copolymer S-M/S-S 1 of about 152 kg/mol true Mw.

Example 7

Inventive polymer S-M/Bd-S 2 was selectively hydrogenated using the following procedure. Hydrogenation catalysts were prepared as stock solutions having a nickel concentration of 5455 parts per million (ppm) or cobalt concentration of 9230 ppm. The catalysts are prepared in the stock solution using cobalt neodecanoate or nickel octoate by diluting the Co or Ni carboxylate in cyclohexane and then slowly adding triethyl aluminium to achieve a 2.0/1 molar ratio of Al/M (M=Co or Ni).

A stainless steel 15 liter water-cooled autoclave, equipped with a gas recirculation impeller (inducing both liquid and gas/liquid mixing) was charged with the polymer mixture S-M/Bd-S 2, synthesized as described in example 1 and transferred under inert atmosphere. This mixture was diluted with 1 kg cyclohexane and subsequently saturated with $H_2$ gas by purging three times with $H_2$ gas (10 bar), the temperature was 44° C. Next, at 10 bar $H_2$ pressure, 11 g of catalyst solution was added to obtain a concentration of 10 ppm Ni in the reaction mixture. After addition, the temperature was gradually raised to 70° C. and the hydrogen pressure to 40 bar. After 90 minutes another aliquot of catalyst was added, increasing the concentration to 20 ppm Ni, and 480 minutes later, another aliquot increasing the catalyst concentration to 40 ppm Ni. 165 minutes later an aliquot (26 g) of a catalyst solution containing Co catalyst was added. The amount added resulted in a Co concentration of 40 ppm in the reaction mixture. Before each catalyst addition the reaction mixture is purged three times with nitrogen (4 bar) and next with $H_2$ (10 bar). During the reaction samples were taken and analyzed by $^1H$ NMR to determine the degree of conversion of the alkyl unsaturation. When the alkyl unsaturation is below 0.3 meq/g, the reaction mixture was acidified with 2-ethylhexanoic acid (13 mL). Half of the reaction mixture was transferred into a 15 L glass unit, subsequently 1.5 L of a 1 w % citric acid solution was added and the mixture was stirred and heated to 70° C. At this temperature, while stirring, compressed air was bubbled through the mixture. The color changed from very dark to colorless. Stirring was stopped and the organic and aqueous phases were allowed to separate, after which the aqueous phase was removed. This procedure was repeated when a dark precipitate was formed on the aqueous layer. 500 mL of water and 4 mL isopropylalcohol were added to remove this precipitate. After separation, the organic phase was washed again with 1.5 L of a 1 wt. % citric acid solution. Next the organic phase was washed with a solution of ammonia (1-3 mL) in 1 L water. This was repeated twice. Next the organic phase was washed twice with 1 L water. The same washing procedure was applied to the other half of the hydrogenation reaction mixture. Antioxidant A0330 (0.1 wt. %) was added to the resulting polymer solution. Polymer crumbs were obtained by steam coagulation finishing, followed by drying in an oven at 50° C.

The resulting selectively hydrogenated styrenic block copolymer (HSBC) was characterized using GPC, having a Mp (apparent) of the triblock $(A-B)_2X$ of 110 kg/mol and a CE of 82.2%.

The properties of the HSBC(S-M/Bd-S2) were compared to a selectively hydrogenated SBdS (SEBS) as set forth below in Table 6.

TABLE 6

| Polymer properties midblock type | | HSBC(S-M/Bd-S 2) hydrogenated myrcene/butadiene | SEBS Ethylene Butylene |
|---|---|---|---|
| MFR at 200° C./5.0 kg | (g/10 min) | 13 | 13 |
| MFR at 230° C./2.16 kg | (g/10 min) | 17 | 17 |
| Film cast from solution | | | |
| Tensile strength | MPa | 9 | 11.5 |
| Modulus at 300% elongation | MPa | 4 | 4.2 |
| Elongation at break | % | 650 | 700 |
| Compression moulded | | | |
| Hardness (3 × 2 mm) | ShA | 52 | 53 |

The HSBC(S-M/Bd-S 2) and SEBS have comparable mechanical and processing properties.

Example 8 (Hypothetical)

Formulations with good vibration damping properties are prepared as follows. Block copolymers containing a copolymer myrcene block show a high tan delta value over a significant range of temperature, which makes them particularly suitable to be used as a vibration damping component. Moreover the peak temperature of the tan delta curve is controlled by the copolymer myrcene block composition and addition of ingredients such as tackifiers. Its unsaturated nature makes it suitable for subsequent crosslinking, which is often required to satisfy high temperature resistance for specific applications like automotive for example.

The polymers shown below in Table 7 have good vibration damping characteristics when formulated as shown in Table 8.

TABLE 7

| Polymer | S-M/Bd-S 3 | S-M/S-S 2 | S-M/I-S 2 |
|---|---|---|---|
| PSC in endblock, w % | 18 | 20 | 20 |
| Mp Polystyrene (kg/mol) | 10 | 12 | 13 |
| Monomer mixture in myrcene containing block | Butadiene/myrcene | Myrcene/styrene | Myrcene/isoprene |
| Monomer ratio, mol % | 50/50 | 66/34 | 34/66 |
| Rubber vinyl, % | 40% | 9% | 80% |
| Calculated Tg | −40° C. | −20° C. | −10° C. |

TABLE 8

| Formulation | S-M/Bd-S 3 | S-M/S-S 2 | S-M/I-S 2 |
|---|---|---|---|
| Polymer | 100 | 100 | 100 |
| Rosin ester (type Foralyn ™ 90 resin) | 100 | 75 | 50 |
| Mica filler | 50 | 50 | 0 |

The values in the table indicate parts by weight.

The rosin ester shifts the formulation Tg towards the required end-use temperature while the mica filler improves the damping properties at elevated temperature. Mica is a particularly effective platelet filler, not unduly affecting the colour of the final sheet. The total amount of filler employed should be as high as possible because, as the amount increases the damping improves there is a very significant broadening in the plot of damping versus temperature. The upper limit in filler content is however determined by the required physical and mechanical properties of the final sheet. Here the amount is limited to 50 parts per hundred parts by weight of rubber so that vibration damping pads remain flexible and soft. The polymer midblock is unsaturated, which allows it to be crosslinked like vulcanized rubber and improve high temperature performance as well. If improved weatherability is needed (and no curing is desired) hydrogenated grades would be preferred.

Example 9 (Hypothetical)

Cyclohexane, styrene, butadiene and myrcene are purified by activated aluminum oxide and stored at 4° C. under a nitrogen atmosphere. Polymerization is carried out according to the following procedure: The desired amount of solvent (cyclohexane) is added to an autoclave (10 L, water cooled), and heated to 50° C. Sec-butyllithium is added to the autoclave, followed by styrene dose 1 (73.5 g). After polymerization of the styrene monomer (polystyrene 1), the molecular weight is measured using GPC and the residual dose of styrene monomer (11.0 g) is added as needed to obtain the target molecular weight (11.3 kg/mol). After conversion of the second dose of styrene, myrcene monomer in cyclohexane (602.3 g of a 75 wt. % myrcene solution) is added to the reactor. After completion of the myrcene monomer addition, the mixture is allowed to react for another 20 minutes resulting in a living styrene-myrcene diblock having an apparent MW of 99.8 kg/mol. To enhance coupling 6.5 g of butadiene in then added. After that the coupling agent, methyl-trimethoxy-silane (MTMS), is added at a ratio of 0.45 mol MTMS/Li ions (448 mg of MTMS). After 1 hour of coupling time 0.2 ml of methanol is added. A coupled polystyrene-polymyrcene block copolymer having a total apparent molecular weight of 199 kg/mol and a coupling efficiency of 79.4% is formed by such a procedure.

The coupled polystyrene-polymyrcene block copolymer so formed is then selectively hydrogenated using the procedure of Example 7.

Thus it is apparent that there has been provided, in accordance with the invention, a block copolymer of monoalkenyl arene and myrcene/lower molecular weight conjugated diene block copolymer or a block copolymer of monoalkenyl arene and a copolymer block of myrcene and monoalkenyl arene that fully satisfies the objects, aims, and advantages set forth above. While the invention has been described in conjunction with specific embodiments thereof, it is evident that many alternatives, modifications, and variations will be apparent to those skilled in the art in light of the foregoing description. Accordingly it is intended to embrace all such alternatives, modifications and variations as fall within the spirit and broad scope of the appended claims.

The invention claimed is:

1. A block copolymer comprising: at least one monoalkenyl arene monomer polymer block (A) and copolymer block (B) containing myrcene, said copolymer block (B) further comprising:
    a) at least one conjugated diene monomer having a lower molecular weight than myrcene, or
    b) at least one monoalkenyl arene monomer, or
    c) a mixture of (a) and (b),
    wherein the copolymer block B has a vinyl content from about 5 to about 80 mol. %,
    wherein the block (A) has a molecular weight of from 3 kg/mol to about 60 kg/mol and the copolymer block (B) has a molecular weight of from about 10 kg/mol to about 500 kg/mol,
    wherein the block copolymer has a structure according to the following general formulae: A-B, A-B-A, A-B-A', (A-B)$_n$, (A-B)$_n$-A, (A-B-A)$_n$X, (A-B)$_n$X, (A-B-A')$_n$X, (A-B-A')$_n$X, (A-B-B')$_n$X and A-B-A'-B-A, wherein X is the residue of a coupling agent, n is an integer and ranges from 2 to 5, A and A' are polymer blocks of monoalkenyl arene(s) and A and A' may differ with regard to molecular weight or composition, B and B' are copolymer blocks of myrcene and at least one other monomer and B and B' may differ with regard to molecular weight or composition, and wherein the myrcene content of the B block is from 25 to 85 mol. %.

2. The block copolymer of claim 1, wherein said monoalkenyl arene monomer is selected from styrene, methylstyrene, p-tert-butylstyrene, dimethylstyrene, alpha-methylstyrene, diphenyl ethylenes, and mixtures of these.

3. The block copolymer of claim 1, wherein said at least one conjugated diene monomer having a lower molecular weight than myrcene selected from butadiene, isoprene, piperylene, 1,3-hexadiene, or a mixture thereof.

4. The block copolymer of claim 1 wherein the monoalkenyl arene content is at least 10 wt. % based on the total weight of the block copolymer.

5. The block copolymer of claim 1 wherein the A blocks comprise styrene and the B blocks comprise myrcene and isoprene.

6. The block copolymer of claim 1 wherein the A blocks comprise styrene and the B blocks comprise myrcene and butadiene.

7. The block copolymer of claim 1 wherein the A blocks comprise styrene and the B blocks comprise myrcene and styrene.

8. The block copolymer of claim 1, where the structure of the copolymer block B may have a random, tapered or controlled distribution configuration of comonomers.

9. A block copolymer comprising at least one monoalkenyl arene polymer block A and at least one copolymer block B comprising myrcene, said copolymer block B further comprising:
    a) at least one conjugated diene monomer having a lower molecular weight than myrcene, or
    b) at least one monoalkenyl arene monomer, or
    c) a mixture of (a) and (b),
    wherein said block copolymer has been selectively or exhaustively hydrogenated,
    wherein the copolymer block B has a vinyl content from about 5 to about 80 mol. %,
    wherein the block (A) has a molecular weight of from 3 kg/mot to about 60 kg/mol and the copolymer block (B) has a molecular weight of from about 10 kg/mol to about 500 kg/mol,
    wherein the block copolymer has a structure according to the following general formulae: A-B, A-B-A, A-B-A', (A-B)$_n$, (A-B)$_n$-A, (A-B-A)$_n$X, (A-B)$_n$X, (A-B-A')$_n$X, (A-B-A')$_n$X, (A-B-B')$_n$X and A-B-A'-B-A, wherein X is the residue of a coupling agent, n is an integer and ranges from 2 to 5, A and A' are polymer blocks of monoalkenyl arene(s) and A and A' may differ with regard to molecular weight or composition, B and B' are copolymer blocks of myrcene and at least one other monomer and B and B' may differ with regard to molecular weight or composition, and wherein the myrcene content of the B block is from 25 to 85 mol. %.

10. The block copolymer of claim 9 wherein the block copolymer has been selectively hydrogenated such that at least about 60 mol. % of the double bonds of the conjugated diene units have been reduced and between 0 and 10 mol. % of the arene double bonds present in the polymerized monoalkenyl arene units have been reduced.

11. An adhesive formulation comprising:
    a) 100 parts by weight of said block copolymer of claim 1 and;
    b) from about 30 to 250 parts by weight of a tackifier, based on 100 parts of said block copolymer where the tackifier is selected from the group consisting of C$_5$ hydrocarbon resins, C$_5$/C$_9$ hydrocarbon resins, hydrogenated or partially hydrogenated C$_9$ hydrocarbon resins, rosin esters, rosin derivatives, and mixtures thereof; and
    c) from about 0 to 80 parts by weight of a plasticizer, based on 100 parts of said block copolymer; and
    d) from about 0.1 to 3 parts by weight of a stabilizer, based on 100 parts of said block copolymer.

12. The adhesive formulation of claim 11, wherein said monoalkenyl arene is selected from styrene, methylstyrene, p-tert-butylstyrene, dimethylstyrene, alpha-methylstyrene, diphenyl ethylenes and mixtures of these.

13. The adhesive formulation of claim 11, wherein said at least one conjugated diene monomer having a lower molecular weight than myrcene may be selected from butadiene, isoprene, piperylene, 1,3-hexadiene, or a mixture thereof.

14. A vibration damping composition comprising: 100 parts by weight of the block copolymer of claim 1, from about 0 to about 150 wt. parts of tackifier, and optionally up to about 800 wt. parts filler.

15. The vibration damping composition of claim 14 wherein the filler is selected from the group consisting of mica, talc, flaked aluminum, flaked lead, graphite, clay, calcium carbonate, barytes, silica and iron powder.

16. The vibration damping composition of claim 14 wherein the block copolymer is selectively hydrogenated.

\* \* \* \* \*